UNITED STATES PATENT OFFICE.

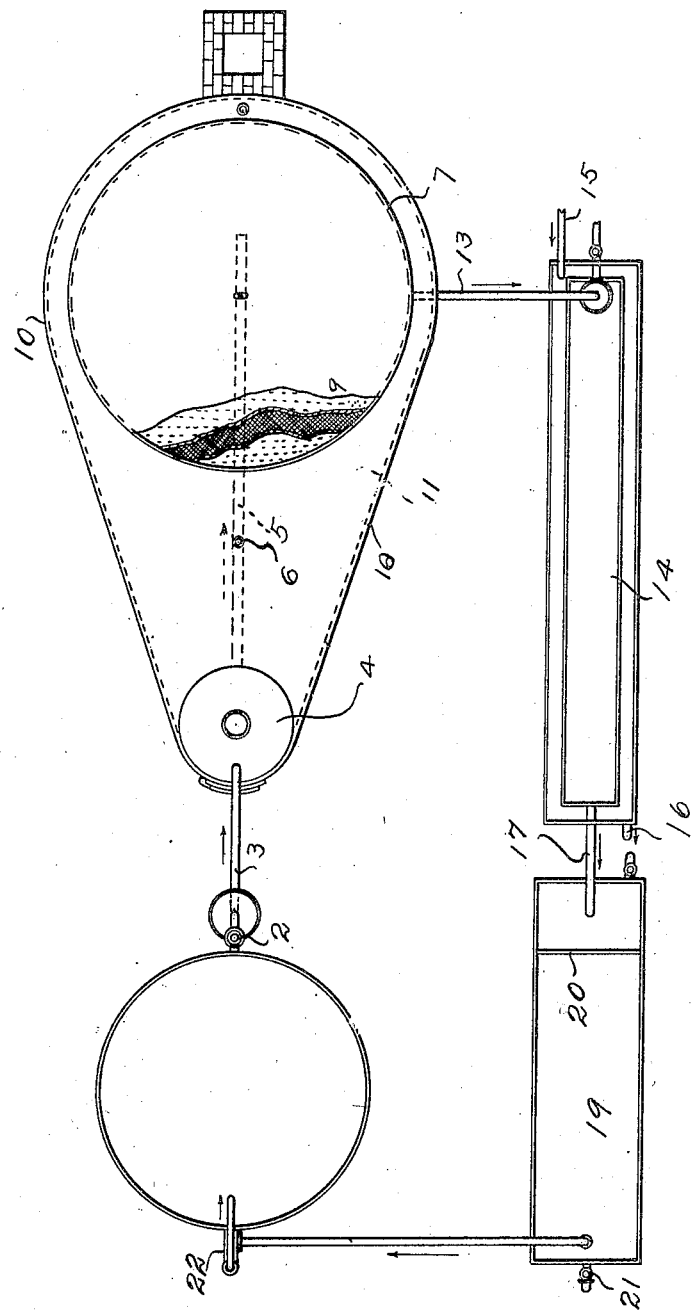

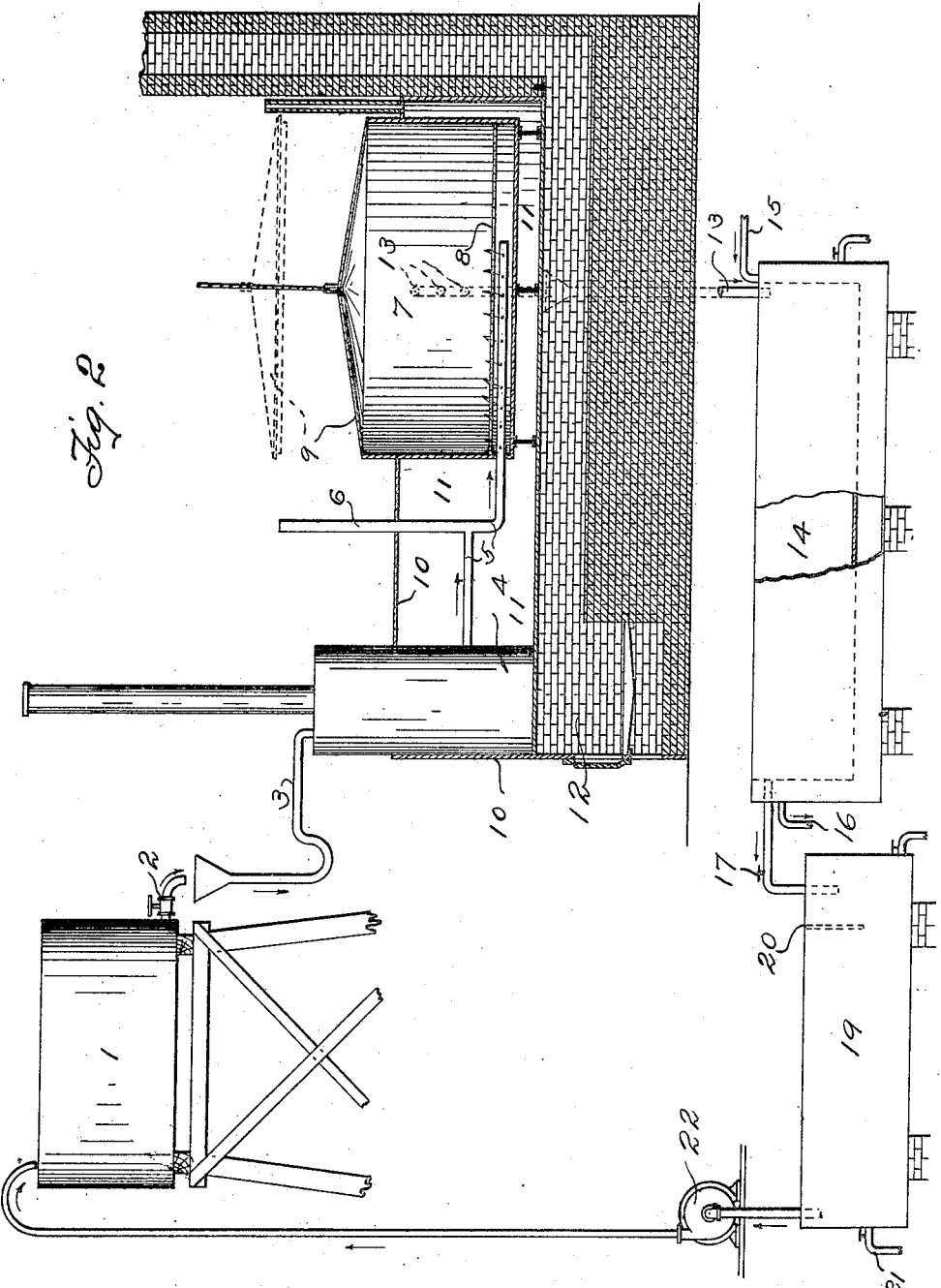

STANLEY C. C. CURRIE, OF LOS ANGELES, CALIFORNIA.

PROCESS OF TREATING ORES.

No. 881,101.   Specification of Letters Patent.   Patented March 3, 1908.

Application filed May 16, 1904, Serial No. 208,192. Renewed June 28, 1907. Serial No. 381,354.

*To all whom it may concern:*

Be it known that I, STANLEY C. C. CURRIE, a subject of the King of Great Britain, residing at Los Angeles, in the county of Los Angeles and State of California, have invented certain new and useful Improvements in Processes of Treating Ores; and I do hereby declare the following to be a full, clear, and exact description of the invention, such as will enable others skilled in the art to which it appertains to make and use the same.

This invention relates to the process or method of treating ores or concentrates thereof, and some of the objects of the invention are to provide a simple and cheap method or process of extracting metals from ores.

Another object of the invention is to employ hot solutions for the purpose of dissolving out certain metals or metallic salts which may be soluble or held in suspension by said hot solutions.

It is also an object of this invention to recover the metals or metallic salts by further precipitation from the solution in which they were extractable from the ore, as for instance an ore containing lead, zinc, or bismuth, etc. By subjecting such an ore, under suitable conditions, to a treatment with hot caustic alkali in solution, the above mentioned metals or certain salts of the same may be extracted.

Still a further object of the invention is to pass the hot solution through the ore in such a manner, and under such conditions, as, to avoid the necessity of stirring or agitating the ore during the process of lixiviation, whereby the solution becomes turbid and mixed with solid matter in the form of slime etc., which is particularly undesirable in the case of certain metals and metallic salts which are soluble in hot solutions by precipitating therefrom on cooling. In such cases the metals or metallic salts which it is desired to recover would be retained in the filter, mixed with undesirable elements, unless the solution during the process of filtration were maintained at a sufficiently high temperature.

It is also an object of this invention to insure a constant flow through the ore of fresh solution, or a solution as free as possible from any excess of the metals or metallic salts as may be soluble in the same.

The attainment of the foregoing results insures the maintenance of full solvent functions of the solution in the most efficient manner.

This invention consists broadly of first heating the solution, then passing the same through the ore, thence conducting the solution, free from any solid undesirable substance, into a cooling, settling or precipitating tank, in which latter the metals or metallic salts will be precipitated as required in such tank, and, after the extraction or elimination of such metals or metallic salts from the solution, to again heat and return the solution through the ore in a regenerated condition.

The construction illustrated in the appended drawings illustrates a type or form of apparatus that may be employed in carrying out this method or process, but it will be understood that the latter is in no manner limited to use with such apparatus as any suitable apparatus may be employed which is found desirable in practice.

Figure 1 of the drawings is a top plan view, partially broken away, illustrating one form of apparatus in connection with which this process may be illustrated; and Fig. 2 is a side elevational view, partly in section, and partly broken away, of the construction shown in Fig. 1.

Similar characters of reference designate corresponding parts throughout the several views.

Referring to the drawings, the reference character 1 designates a reservoir or receiving receptacle, provided with a valve-controlled outlet 2, constructed to discharge the contents thereof into a pipe or connection 3 communicating with a heating receptacle or tank 4, having a connection 5 preferably provided with a vent or exhaust extension 6, and terminating within the ore receptacle or vat 7, desirably beneath the perforated false bottom 8 thereof, substantially as shown in Fig. 2 of the drawings.

The ore receptacle 7 is desirably provided with a removable top or cover 9, and the ore receptacle 7 and the heating receptacle or tank 4 are preferably located within a sheath or casing 10 forming a liquid receptacle or chamber 11, having suitable connections (not shown) with the source of liquid supply; and a furnace or other heating apparatus 12 is preferably disposed beneath the sheath or casing 10 to heat the liquid therein, as will be readily understood by those skilled in the art to which this invention appertains.

The ore receptacle 7 is preferably provided with a plurality of connections 13 with a cooling receptacle 14, having suitable inlet and outlet connections 15 and 16 for the cooling agent employed, and with a valve controlled outlet 17 as well as a connection 18 with a precipitating tank or receptacle 19, preferably provided with a depending partial partition or ledge 20 and with a valve controlled outlet 21, substantially as shown. An exhausting apparatus 22 is preferably connected with the precipitating tank 19 and with the reservoir 1, thereby completing the circuit of fluid throughout the apparatus above described.

The operation of this invention, in connection with the apparatus herein shown and described, will be readily understood from the foregoing description when taken in connection with the accompanying drawings and the following explanation thereof. The solution passes from the reservoir 1 into the receptacle 4, wherein the liquid is heated by the surrounding hot liquid, and when so heated passes through the connection 5 into the bottom of the ore receptacle 7, the gases or bubbles in the solution escaping through the vent or outlet 6 during such passage; and when liberated beneath the perforated false bottom in the ore receptacle 7 the solution rises through the ore and passes from said receptacle to the cooling receptacle, by way of connections, and from the cooling receptacle the solution passes into the precipitating tank or receptable to be withdrawn therefrom by the exhausting apparatus or pump and redelivered into the reservoir 1 to be returned in the cycle of operation to the ore in a regenerated condition.

It is not desired to limit or confine this invention to the exact method or sequence of steps herein set forth and to the exact temperatures specified or to any particular strength of solution, as the same may be varied in operation without departing from the spirit and scope of the invention.

Claims.

1. The herein described process or method of extracting bismuth from ores which consists in passing a hot caustic alkali solution through the ore containing bismuth and maintaining the heat of the ore in the solution during such passage and finally withdrawing the solution.

2. The herein described process of extracting bismuth which consists in passing a hot caustic alkali solution through the ore containing the bismuth, then maintaining the heat of the ore in the solution, then withdrawing and cooling the solution, then extracting the bismuth from the solution.

3. The herein described process or method of extracting bismuth which consists in first passing a hot caustic alkali solution through the ore, then cooling and precipitating metals and metallic salts therefrom, then reheating the solution and repassing the solution through the ore.

In testimony whereof, I have signed my name to this specification, in the presence of two subscribing witnesses at Los Angeles, county of Los Angeles, State of California this second day of May 1904.

STANLEY C. C. CURRIE.

Witnesses:
MIGNON FORD,
OWEN G. CATES.